United States Patent
Breynaert

(10) Patent No.: US 6,191,514 B1
(45) Date of Patent: Feb. 20, 2001

(54) METHOD FOR ACTIVATING FOR INSTANCE A MOTOR VEHICLE OPERATING DEVICE

(75) Inventor: Francois Breynaert, Caen (FR)

(73) Assignee: Meritor Light Vehicle Systems - France (FR)

( * ) Notice: Under 35 U.S.C. 154(b), the term of this patent shall be extended for 0 days.

(21) Appl. No.: 09/254,033

(22) PCT Filed: Jul. 2, 1998

(86) PCT No.: PCT/FR98/01419

§ 371 Date: Jun. 1, 1999

§ 102(e) Date: Jun. 1, 1999

(87) PCT Pub. No.: WO99/01923

PCT Pub. Date: Jan. 14, 1999

(30) Foreign Application Priority Data

Jul. 2, 1997 (FR) .................................................. 97 08354

(51) Int. Cl.[7] ............................. H02K 11/00; H02K 5/00; H02K 5/16; H01R 39/38
(52) U.S. Cl. .......................... 310/90; 310/68 B; 310/89; 310/239
(58) Field of Search ...................... 310/90, 68 B, 310/89, 40 MM, 43, 239, 91; 29/596

(56) References Cited

U.S. PATENT DOCUMENTS

| | | |
|---|---|---|
| 4,385,276 | 5/1983 | Bitzel ................................... 324/174 |
| 4,406,963 * | 9/1983 | Wolf et al. ........................... 310/239 |
| 4,734,606 * | 3/1988 | Hajec .................................... 310/90 |
| 4,857,784 * | 8/1989 | Mukaekubo ....................... 310/68 B |
| 4,934,041 | 6/1990 | Hoover et al. .......................... 29/596 |
| 4,952,830 * | 8/1990 | Shirakawa ........................... 310/68 B |
| 5,006,747 * | 4/1991 | Stewart, Sr. .............................. 310/90 |
| 5,006,943 * | 4/1991 | Elsasser et al. ....................... 310/156 |
| 5,144,738 | 9/1992 | Oyafuso ................................. 29/596 |
| 5,172,021 * | 12/1992 | Takahashi et al. ..................... 310/90 |
| 5,414,317 | 5/1995 | Reid et al. ............................ 310/239 |
| 5,543,671 | 8/1996 | Williams ................................ 310/71 |
| 5,543,672 * | 8/1996 | Nishitani et al. ..................... 310/156 |
| 5,622,508 * | 4/1997 | Nagahata et al. ...................... 439/79 |
| 5,736,799 * | 4/1998 | Harano et al. .......................... 310/90 |
| 5,831,358 * | 11/1998 | Bobay ................................. 310/68 B |
| 5,895,994 * | 4/1999 | molnar et al. ..................... 310/68 B |

FOREIGN PATENT DOCUMENTS

| | | |
|---|---|---|
| 4128110A1 | 8/1991 | (DE) . |
| 4326391A1 | 9/1995 | (DE) . |
| 2539930A1 | 7/1984 | (FR) . |

\* cited by examiner

*Primary Examiner*—Nestor Ramirez
*Assistant Examiner*—Dang Dinh Le
(74) *Attorney, Agent, or Firm*—Carlson, Caskey & Olds

(57) ABSTRACT

A motor assembly that is useful for operating various devices on a vehicle includes a unique arrangement for securing a detector arrangement within the motor assembly. The detector arrangement includes a first portion that is supported on a shaft associated with the rotor portion of the assembly. A second portion of the detector arrangement is supported by a flange, which is associated with the stator of the assembly. The second portion of the detector assembly includes a printed circuit board that is received within a recessed housing formed on the flange. The recessed housing includes at least one surface that abuts the circuit board into a position where cooperating locking features operate to secure the printed circuit board in a desired position on the flange.

15 Claims, 1 Drawing Sheet

METHOD FOR ACTIVATING FOR INSTANCE A MOTOR VEHICLE OPERATING DEVICE

The present invention relates to an actuating motor, of a functional unit of a motor vehicle for example.

Such motors find many applications particularly in motor vehicles, in order to provide actuation for functional units, such as seats, windows, sun roofs, etc, of these vehicles.

In general, such motors include a stator in which a rotor is arranged, the stator including, at each of it ends, a flange for guiding the corresponding end of a shaft linked to the rotor, and each guide flange includes a guide bearing configured to accommodate a corresponding end portion of the shaft when this flange is assembled onto the stator.

Moreover, the motors of this type also include means for supporting a brush-holder plate, arranged in the stator close to one of its ends, these support means being held in assembled position in the stator by elastic means interposed between the corresponding flange and these means.

Finally, some motors are also equipped with means for detecting the rotation of the shaft comprising a first portion carried by this shaft and a second portion carried by a corresponding flange.

The object of the invention is to propose various improvements to the motors of this type, with a view to simplifying the structure and assembly, and to reduce their manufacturing cost.

To that end, the subject of the invention is an actuating motor, for example of a functional unit of a motor vehicle, of the type including a stator in which a rotor is arranged, the stator including, at each of its ends, a flange for guiding the corresponding end of a shaft linked to the rotor, each guide flange including a guide bearing configured to accommodate a corresponding end portion of the shaft when this flange is assembled onto the stator, and means for detecting the rotation of the shaft comprising a first portion carried by this shaft and a second portion carried by a corresponding flange, characterized in that the second portion of these detection means which is carried by the corresponding flange is arranged on a printed circuit board configured so as to be engaged in a corresponding recessed housing of the flange, and in that the flange and the plate include means for complementary locking in assembled position by elastic clipping.

This makes it possible to simplify the structure of this motor, to the extent that, in the state of the art, the second portion of the detection means is bonded or welded to the corresponding flange.

Moreover, each flange includes axial abutment means configured to interact with the corresponding end of the shaft so as to hold the rotor in axial position in the stator.

This makes it possible to simplify the structure of such a motor, to the extent that, in the state of the art, the rotor is held in axial position in the stator by elements in the form of washers force-fitted over each end of the shaft of the motor, these washers being configured to come to bear against the guide bearings of the flanges.

Advantageously, this motor also includes means for supporting a brush-holder plate, which are arranged in the stator close to one of its ends, these support means being held in assembled position in the stator by elastic means interposed between the corresponding flange and these means, and in the motor according to the invention the elastic means comprise at least one elastic tab made of the same material as the rest of the flange, this tab being configured to press the means for supporting the brush-holder plate elastically into assembled position in the stator and to make it possible to take up the clearances in assembling the means in the stator.

This also makes it possible to simplify the structure of this motor, to the extent that, in the state of the art, an elastic ring is arranged between the flange and the means for supporting the brush-holder plate in order to hold the means in assembled position.

The invention will be better understood with the aid of the description which will follow, given solely by way of example, and by referring to the attached drawings, in which.

Figure 1:
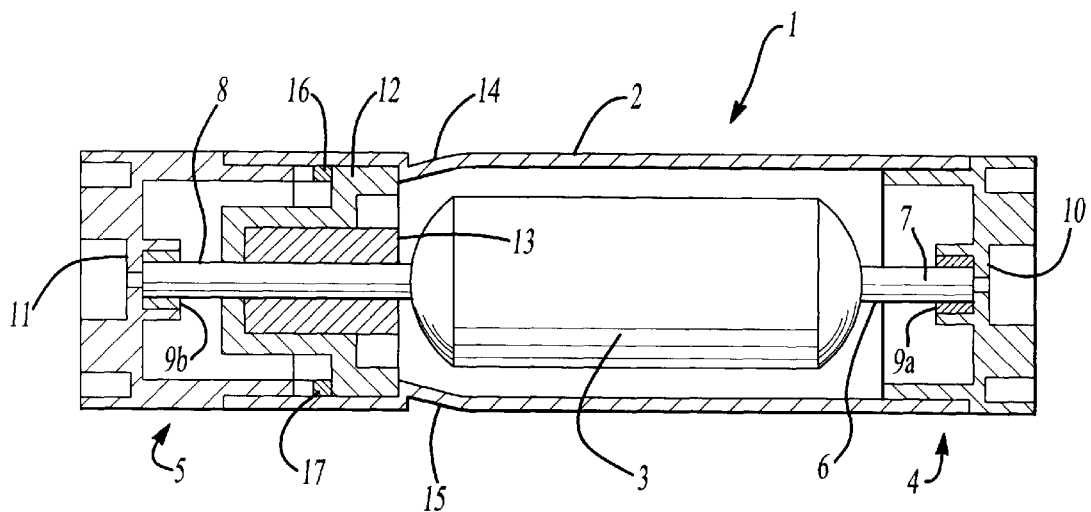
FIG. 1 represents a diagrammatic sectional view illustrating the general structure of an actuating motor according to the invention.

In FIG. 1, a motor for actuating a functional unit of a motor vehicle can in fact be recognized, this motor being designated by the overall reference 1.

This motor is thus a direct-current, permanent-magnet motor.

In a conventional way, such an actuating motor comprises a stator designated by the overall reference 2, in which is arranged a rotor designated by the overall reference 3.

The stator includes, at each of its ends, a flange for guiding the corresponding end of a shaft linked to the rotor.

These flanges are designated by the overall references 4 and 5 in this FIG. 1.

The shaft is itself designated by the overall reference 6 and has ends 7 and 8 respectively, guided in the guide flanges 4 and 5.

Advantageously, each guide flange 4 and 5 includes a guide bearing, 9a and 9b respectively, configured to accommodate the corresponding end portion of the shaft when the flange is assembled onto the stator.

Various embodiments of these flanges and of these guide bearings have already been described in the state of the art.

It will be noted, for example, that these guide bearings may exhibit the form of rings held in corresponding cages of the flanges.

Clearly, bearings made of the same material as the flanges can also be envisaged.

Each flange 4, 5 also includes axial abutment means configured to interact with the corresponding end of the shaft so as to hold the rotor in axial position in the stator.

These axial abutment means are designated by the overall references 10 and 11 in this FIG. 1, in the case of the flanges 4 and 5 respectively.

In fact, these axial abutment means may consist, for example, of an abutment surface made of the same material as the rest of each corresponding flange, this abutment surface being configured to extend opposite at least a part of the corresponding end of the shaft so as to lock the end in axial position.

It is then seen that, when the flanges are assembled onto the stator of the motor, the rotor is locked in axial position between the abutment means of these flanges.

It was said above that these abutment means could include an abutment surface made of the same material as the rest of the flange.

It goes without saying, obviously, that other embodiments of these abutment means may be envisaged.

Hence, for example, these abutment means may include an abutment element produced separately from the rest of the flange and fixed onto it.

This abutment element may then, for example, take the form of a washer fixed, for example, by being sunk into the flange, this washer being configured to hold the corresponding end of the shaft and thus the rotor in axial position.

Moreover, such a motor may also include means for supporting a brush-holder plate, which are arranged in the stator close to one of its ends, these support means being held in assembled position in the stator by elastic means interposed between the corresponding flange and these means.

These means for supporting a brush-holder plate are designated by the overall reference 12 in FIG. 1.

These means are then arranged opposite a collector 13 of the rotor of the motor, this collector being carried by the shaft of this rotor.

The means 12 for supporting the brush-holder plate are then held in assembled position in the stator, for example by abutment means of the stator, consisting, for example, of parts projecting inwards on it, obtained by swaging of this stator, these projecting parts being designated, for example, by the overall references 14 and 15 in this FIG. 1, and by elastic means interposed between the corresponding flange 5 for example and these means.

These elastic means are designated, for example, by references 16 and 17 in this FIG. 1.

Figure 2:
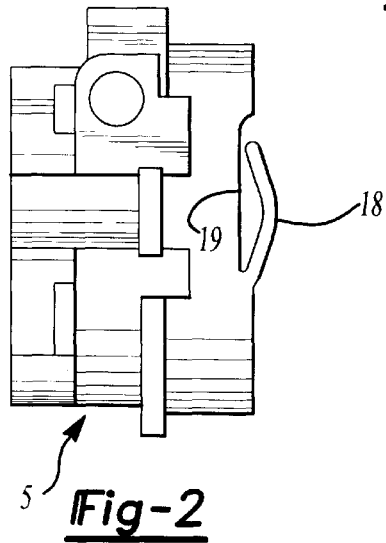
FIG. 2 represents a side view illustrating a flange forming part of such a motor.

These elastic means may in fact, as can be seen in FIG. 2, comprise at least one elastic tab made of the same material as the rest of the flange 5, this tab being designated, for example, by the overall reference 18 in FIG. 2, and being configured so as to press the means 12 of supporting the brush-holder plate elastically into assembled position in the stator and to make it possible to take up clearances in assembling the means in this stator.

It goes without saying, obviously, that these elastic means may include at least two diametrally opposed tabs constituting the elastic means 16, 17 as illustrated in FIG. 1.

Each tab, 18 for example, may exhibit the general shape of a V, one of whose branches at least is linked to the rest of the flange 5. The, or each, tab, may also be formed in a corresponding clearance of the flange, such as the clearance designated by the overall reference 19 in FIG. 2.

It can then be seen that, when the flange is assembled onto the stator, the or each tab made of the same material as the stator, comes to bear against the means 12 of supporting the brush-holder plate so as to hold the means in assembled position in the stator, this being done without requiring the use of supplementary parts.

Such a motor may also include means for detecting the rotation of the shaft, comprising a first portion carried by this shaft and a second portion carried by a corresponding flange.

Conventionally, the first portion of these detection means, carried by the shaft of the rotor, may, for example, include a coded magnetic wheel, while the second portion of them may include sensors, for example Hall-effect sensors, making it possible to detect the rotation of the coded wheel carried by the shaft of the rotor.

Figure 3:
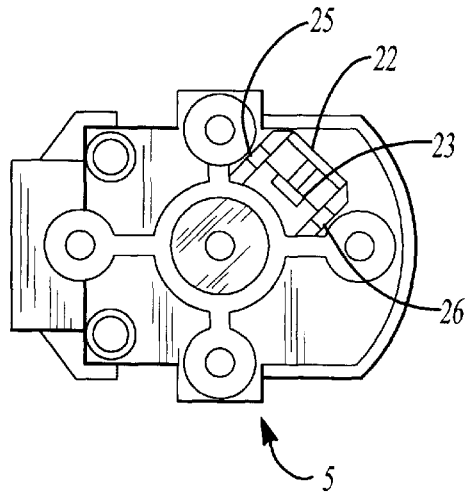
FIG. 3 represents an end view of a flange forming part of such a motor.
Figure 4:
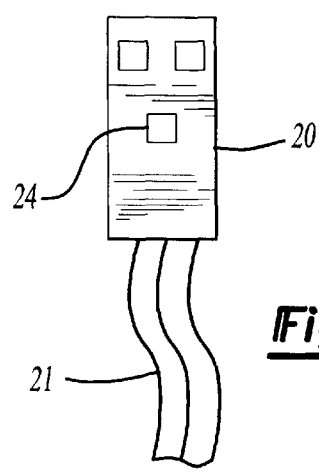
FIG. 4 represents a top view of a second portion of rotation detection means, forming part of such a motor.

As can be seen in FIGS. 3 and 4, the second portion of these detection means, carried by the corresponding flange, may be arranged on a printed circuit board designated by the overall reference 20, from which, for example, conductors 21 extend for supplying power to this second portion of these detection means and for communicating the output signals therefrom to the rest of the circuits of the vehicle.

This printed circuit board 20 is thus configured to be engaged in a corresponding recessed housing 22 of the flange, for example 5, the flange 5 and the board 20 including complementary means for locking in assembled position by elastic clipping.

As illustrated, these elastic clipping means may include at least one catch on one of the elements, flange or board, and a complementary recess in the other element, board or flange.

In the example illustrated, the catch is designated by the overall reference 23, this catch being elastically deformable and being made of the same material as the flange, while the complementary recess designated by the overall reference 24 is provided in the printed circuit board 20.

The catch can then be provided on one of the transverse edges of the recess, while the lateral edges thereof may include grooves 25 and 26 for guiding the board into assembled position in the recess.

It can then be seen that, in order to assemble the second portion of these detection means onto the corresponding flange, it is sufficient to engage the printed circuit board in the guidance grooves 25 and 26 up to the moment when this board arrives at the assembled position in the recess of this flange and when the catch 23, after having been withdrawn elastically in order to allow this board to pass, is moved towards an active position for locking the board in this assembled position by engaging in the complementary recess in it.

These various improvements made to this motor thus make it possible to simplify its structure and its assembly, which translates into a reduction in the costs of manufacturing it.

What is claimed is:

1. An actuating motor including a stator in which a rotor is arranged, the stator including at each of its ends, a flange for (guiding the corresponding end of a shaft linked to the rotor, each guide flange including a guide bearing configured to support a corresponding end portion of the shaft when the flange is assembled onto the stator, and means for detecting the rotation of the shaft comprising a first portion carried by the shaft and a second portion carried by a corresponding flange, the second portion of the detection means arranged on a printed circuit board that is engaged by at least one surface in a corresponding recessed housing formed as part of the flange, the flange and the circuit board include means for complementary locking in assembled position by elastic clipping, the surface in the recessed housing abutting the circuit board into a position where the complementary locking means operates to secure the board in a desired position, said complementary locking means including a tab on one of said board and said recessed housing, and an opening in the other, said tab extending into said opening to secure said board as recited.

2. The actuating motor according to claim 1, wherein the elastic clipping means comprise at least one catch on one of the flange or board, and a complementary recess in the other of the board or flange.

3. The actuating motor according to claim 2, wherein the catch is elastically deformable and is made of the same material as the flange while the complementary recess is provided in the board.

4. Motor according to claim 3, wherein the catch is formed on one of the transverse edges of the recessed housing, while the lateral edges of the recessed housing include grooves including the one surface for guiding the board into the desired position in the recessed housing.

5. The actuating motor according to claim 1, and including means for supporting a brush-holder plate arranged in the stator close to one of its ends, the support means being held in assembled position in the stator by at least one elastic tab member interposed between the corresponding flange and the support means, the elastic tab member being made of the same material as the flange, the tab being configured to press the means for supporting the brush-holder plate elastically into assembled position in the stator and to make it possible to take up clearances in assembling the means in this stator.

6. The actuating motor according to claim 5, including at least two diametrically opposed tabs.

7. The actuating motor according to claim 5 wherein the tab includes a V shape with one branch linked to the rest of the flange.

8. The actuating motor according to claim 5 wherein the tab is formed in a corresponding clearance of the flange.

9. The actuating motor according to claim 1, wherein each flange includes axial abutment means configured to interact with the corresponding end of the shaft so as to hold the rotor in axial position in the stator.

10. The actuating motor according to claim 9, wherein the axial abutment means comprise an abutment surface made of the same material as the rest of the flange.

11. The actuating motor according to claim 9, wherein the axial abutment means comprise an abutment element produced separately from the rest of the flange and fixed onto the flange.

12. The actuating motor according to claim 11, wherein the abutment element includes a washer supported by the flange.

13. An actuating motor assembly, comprising:
    a stator having two ends with a flange at each of the ends;
    a rotor supported within the stator;
    a shaft linked to the rotor, the shaft being guided by the flanges, each flange including a guide bearing that supports a corresponding end portion of the shaft when the flange is assembled onto the stator;
    a detector arrangement that detects rotation of the shaft and includes a first portion supported on the shaft and a second portion supported on one of the flanges, the second portion of the detector arrangement being supported on a printed circuit board;
    the one flange including a recessed housing that receives the printed circuit board and includes at least one surface that abuts the printed circuit board; and
    a locking tab on one of the circuit board or the recessed housing on the flange for locking the circuit board within the recessed housing, the one surface in the recessed housing abutting the circuit board into a position where the locking tab operates to secure the circuit board in a desired position, said locking tab moving into a recess in the other of said circuit board and said recess housing to achieve said securement of said circuit board in a desired position.

14. The assembly of claim 13, wherein the locking tab member is formed as part of the flange and the printed circuit board includes a corresponding recess for receiving the tab member.

15. The assembly of claim 14, wherein the recessed housing includes at least one groove that receives and guides the printed circuit board into the desired position within the recessed housing and where the abutting surface is formed as part of the groove.

* * * * *